United States Patent
Steiner et al.

(10) Patent No.: US 6,585,003 B2
(45) Date of Patent: Jul. 1, 2003

(54) RISING STEM SOFT SEAT PLUG VALVE

(75) Inventors: Carl A Steiner, Erie, PA (US); Ricky L Jackson, Union City, PA (US); Michael S. O'Connell, Erie, PA (US); Lawrence R Zemcik, McKean, PA (US)

(73) Assignee: TM Industrial Supply, Inc., Erie, PA (US)

( * ) Notice: Subject to any disclaimer, the term of this patent is extended or adjusted under 35 U.S.C. 154(b) by 0 days.

(21) Appl. No.: 09/789,406

(22) Filed: Feb. 20, 2001

(65) Prior Publication Data

US 2001/0006080 A1 Jul. 5, 2001

Related U.S. Application Data

(63) Continuation of application No. 09/469,417, filed on Dec. 23, 1999, now Pat. No. 6,196,268.

(51) Int. Cl.$^7$ .................................................. F16K 11/10
(52) U.S. Cl. ................................. 137/625.47; 251/230
(58) Field of Search ................................ 251/230, 160, 251/161, 188; 137/625.47

(56) References Cited

U.S. PATENT DOCUMENTS

| | | | | |
|---|---|---|---|---|
| 1,409,660 A | * | 3/1922 | Brown ........................ 251/230 |
| 1,921,846 A | * | 8/1933 | Sparks ........................ 251/164 |
| 2,001,035 A | | 5/1935 | Noll ....................... 137/625.47 |
| 2,078,231 A | * | 4/1937 | Brisbane ..................... 251/56 |
| 2,139,632 A | * | 12/1938 | Flodin ........................ 251/166 |
| 2,215,853 A | | 9/1940 | McNeal |
| 2,893,681 A | | 7/1959 | McNeal |
| 2,952,526 A | | 9/1960 | Carlson et al. |
| 3,148,553 A | * | 9/1964 | Carr ........................... 251/230 |
| 3,450,383 A | * | 6/1969 | Park, III et al. ............. 251/165 |
| 3,499,467 A | | 3/1970 | McCord et al. |
| 3,552,439 A | * | 1/1971 | Siver .......................... 251/175 |
| 3,595,270 A | | 7/1971 | McNeal, Jr. ................. 137/595 |
| 3,679,060 A | | 7/1972 | Smith ......................... 210/333 |
| 3,757,956 A | | 9/1973 | Bradel et al. ............... 210/333 |
| 3,768,654 A | | 10/1973 | Pearce ........................ 210/232 |
| 4,080,990 A | | 3/1978 | De Benedetti ........... 137/599.1 |
| 4,211,347 A | * | 7/1980 | Mildern ................. 222/402.18 |
| 4,239,185 A | * | 12/1980 | Lowe .......................... 251/164 |
| 4,268,010 A | * | 5/1981 | Behle .......................... 251/144 |
| 4,355,659 A | | 10/1982 | Kelchner ............... 137/625.19 |
| 4,496,493 A | | 1/1985 | Hodakowski et al. ........ 260/940 |
| 4,501,295 A | | 2/1985 | Williams et al. ....... 137/625.19 |
| 4,586,419 A | | 5/1986 | Gerger, Jr. .................... 84/335 |
| 4,606,820 A | | 8/1986 | Rea et al. .................... 210/130 |
| 4,653,537 A | | 3/1987 | Voith ....................... 137/625.43 |
| 4,726,391 A | | 2/1988 | Barra ........................ 137/246 |
| 4,921,598 A | | 5/1990 | Desch ........................ 210/136 |
| 5,084,031 A | | 1/1992 | Todd et al. .................. 604/248 |
| 5,102,543 A | | 4/1992 | Burroughs .................. 210/282 |
| 5,341,834 A | | 8/1994 | Doherty et al. .......... 137/599.1 |
| 5,443,722 A | | 8/1995 | Desai et al. ................. 210/253 |

OTHER PUBLICATIONS

*General Twin Seal™ Double Block and Bleed Shutoff*, General Valve Co., 3 pp.

* cited by examiner

*Primary Examiner*—John Fox
(74) *Attorney, Agent, or Firm*—Webb Ziesenhiem Logsdon Orkin & Hanson, P.C.

(57) ABSTRACT

A rising stem plug valve has a valve body housing that receives a plug. A handle assembly is attached to the plug for rotational movement of the plug between operative positions. A control assembly is attached to the plug for unseating and seating of the plug within the valve body. The plug includes at least one plug portion having openings corresponding to an interior configuration. Ring cords substantially surround the openings in the plug to create a seal therearound. The plug may include upper and lower plug portions with an untapered portion located between them. An O-ring is located on the untapered portion of the plug to maintain separation between the upper and lower plug portions.

14 Claims, 3 Drawing Sheets

RISING STEM SOFT SEAT PLUG VALVE

This application is a continuation of U.S. patent application Ser. No. 09/469,417 entitled "Rising Stem Soft Seat Plug Valve" filed Dec. 23, 1999, now U.S. Pat. No. 6,196,268.

BACKGROUND OF THE INVENTION

1. Field of the Invention

This invention relates to a plug valve, more particularly, to a rising stem single or dual (i.e., stacked) plug valve of the type typically used in dual canister strainer assemblies and as diverter valves.

2. Description of the Prior Art

Plug valves are quite well-known in the art. U.S. Pat. Nos. 2,215,853 and 2,893,681 both to McNeal teach stacked tapered plug valves for two-canister strainers. Stacked, simultaneously operated tapered valves wherein each valve member has an individual taper are disclosed in U.S. Pat. Nos. 3,595,270 to McNeal, Jr. and 3,679,060 to Smith.

U.S. Pat. Nos. 3,499,467 to McCord et al.; 3,768,654 to Pearce; 4,355,659 to Kelchner; and 5,102,543 to Burroughs teach a variety of stacked valves having O-rings or other sealing members positioned between the two valves to maintain a sealing separation between these elements.

The General Twin Seal™ valve by General Valve Company is a rising stem stacked plug valve having seating slips mounted independently on the tapered plug. The seating slips have O-rings located on the outer surface which interact with the valve body to create a seal. The slips have openings that correspond to the plug valve openings. The O-rings are forced into contact with the valve body during seating of the plug. The slips create a double seal around the openings through O-ring contact and metal to metal contact.

The prior art teaches rising stem plug valves wherein each valve is tapered. However, in a rising stem dual plug valve it is undesirable to locate an O-ring for sealing separation between the plug valves and tapered portion of the plug body between the individual valves.

Most of the prior art relies on surface to surface contact of the plug and the valve body to create a seal around the plug openings. For example, consider U.S. Pat. No. 2,001,035 to Noll illustrating a conventional metal to metal seal for a plug valve. When both bodies are metal, this seal is not always adequate. The General Twin Seal™ valve relies not only on surface to surface contact, but also on O-rings. However, the O-rings are located on an independent slip that communicates with the plug and valve body. U.S. Pat. No. 4,726,391 to Barra discloses a complex valve in which each part is surrounded by grooves which receive U-shaped sealing members. The U-shaped sealing members include a passage to transmit leakage. The passage minimizes the total sealing area of the sealing member. The U-shaped sealing member also includes open areas adjacent the valve body to allow for deformation of the sealing portions. These open spaces minimize the support or backing for the sealing portions.

Conventional rising stem plug valves utilize a handle or wheel to raise and lower a stem coupled to the plug in order to unseat and seat the plug within the valve body. While this is practical in some applications, the degree of freedom is somewhat limiting.

SUMMARY OF THE INVENTION

It is an object of this invention to provide a rising stem plug valve assembly comprising an improved seal around each opening in the plug.

It is a further object of the present invention to provide a rising stem dual plug valve wherein the plug comprises an untapered portion between the upper and lower portions of the plug.

It is yet another object of the present invention to provide a greater degree of freedom for raising and lowering the plug during unseating and seating of the plug(s) into a valve housing.

The valve assembly of the present invention is a rising stem plug valve including a valve housing, a plug(s), a handle for rotating the plug between operative positions in a conventional fashion, a stem, and an assembly for unseating and seating the plug within the valve housing. The valve assembly may be a rising stem single plug valve wherein the plug has plug openings to form at least one valve that may be a tapered plug valve. The valve assembly may be a rising stem dual plug valve wherein the plug has integrally formed upper and lower portions each of which have plug openings and may be tapered forming a tapered plug valve.

In the rising stem dual plug valve of the instant invention, positioned between the upper and lower portions of the plug is an O-ring on a straight, untapered portion of the plug. The O-ring maintains fluid separation between the upper and lower portions of the plug, even as the plug is raised.

A control assembly, for example a ratcheting assembly, is coupled to the stem, for example a threading screw. The stem is in turn coupled to the plug. This construction allows for the unseating and seating of the plug within the valve body.

Sealing ring cords, preferably rectangular in cross-section, substantially surround each plug opening thereby creating an improved seal around each opening.

The plug interior pattern between the plug openings of the present invention may be one of many cross-sectional configurations to allow for different flow patterns depending on the application of the valve assembly. In the rising stem dual plug valve of this invention, the upper and lower portions of the plug may have different interior configurations.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
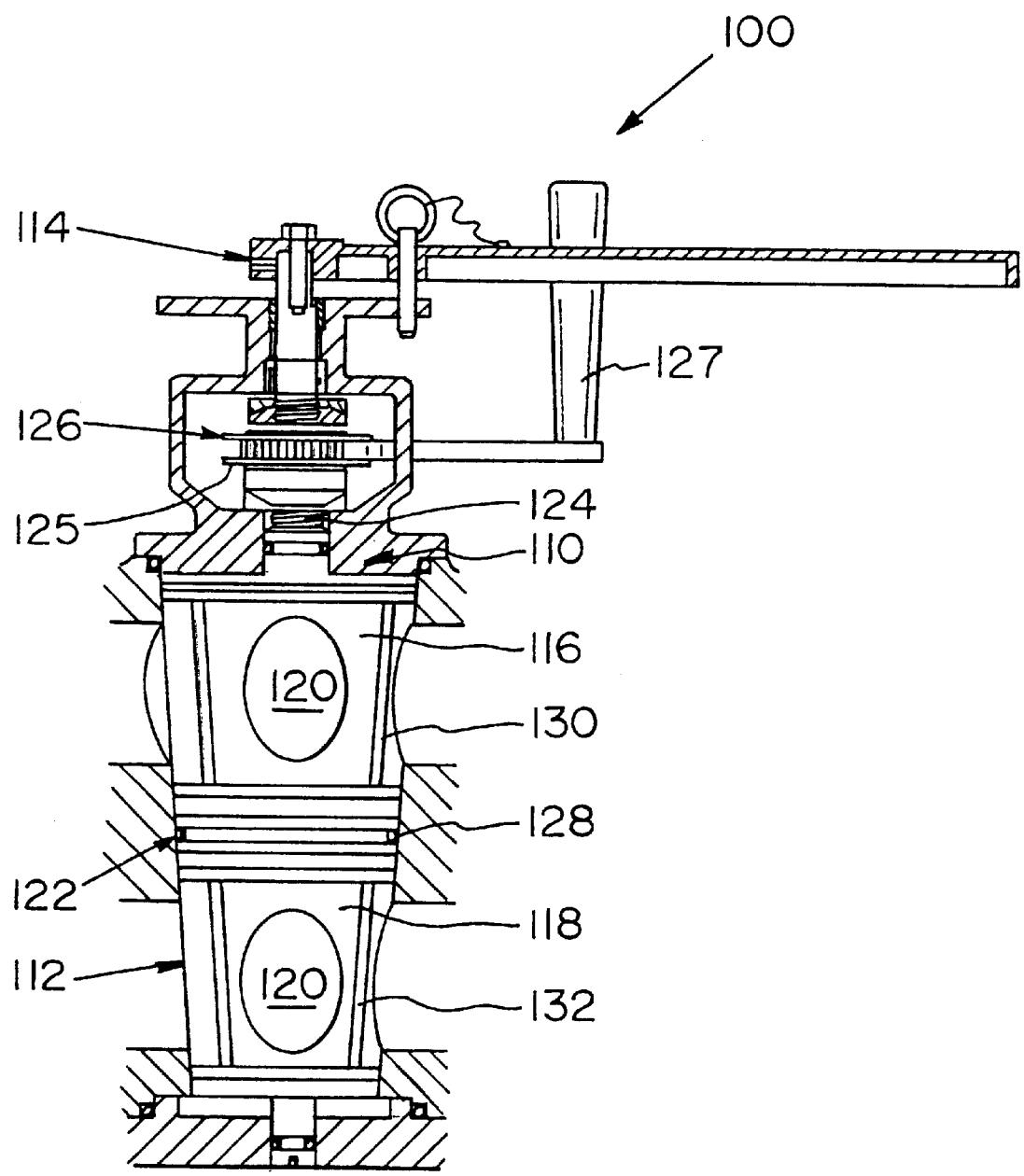
FIG. 1 is a front sectional view of a valve assembly illustrating a rising stem dual plug valve embodiment according to the present invention.

Referring to FIG. 1, a valve assembly 100 according to a first embodiment of the present invention is a rising stem dual plug valve. The valve assembly 100 includes a valve housing 110, a plug 112, and a handle assembly 114. The valve housing 110 is adapted to receive the plug 112 therein.

The handle assembly 114 is coupled to the plug 112 to facilitate rotational movement of the plug 112 between operative positions in a conventional manner. The plug 112 is preferably constructed of stainless steel or bronze.

The plug 112 is comprised of integrally formed upper and lower plug portions 116 and 118, respectively, that each contain a plurality of openings 120. The number and location of openings 120 are such to accommodate the necessary interior configuration of the plug portions 116 or 118 to achieve the desired flow pattern. FIGS. 4a–4d (discussed below) depict exemplary cross-sectional configurations of plug portion 116 and 118 interiors.

In a preferred embodiment, the upper and lower plug portions 116 and 118, respectively, are tapered. The tapering of the plug portions 116 and 118 reduces the amount of drag during movement between operative positions. The angle of taper of the upper plug portion 116 may be different than that of the lower plug portion 118.

Figure 2:
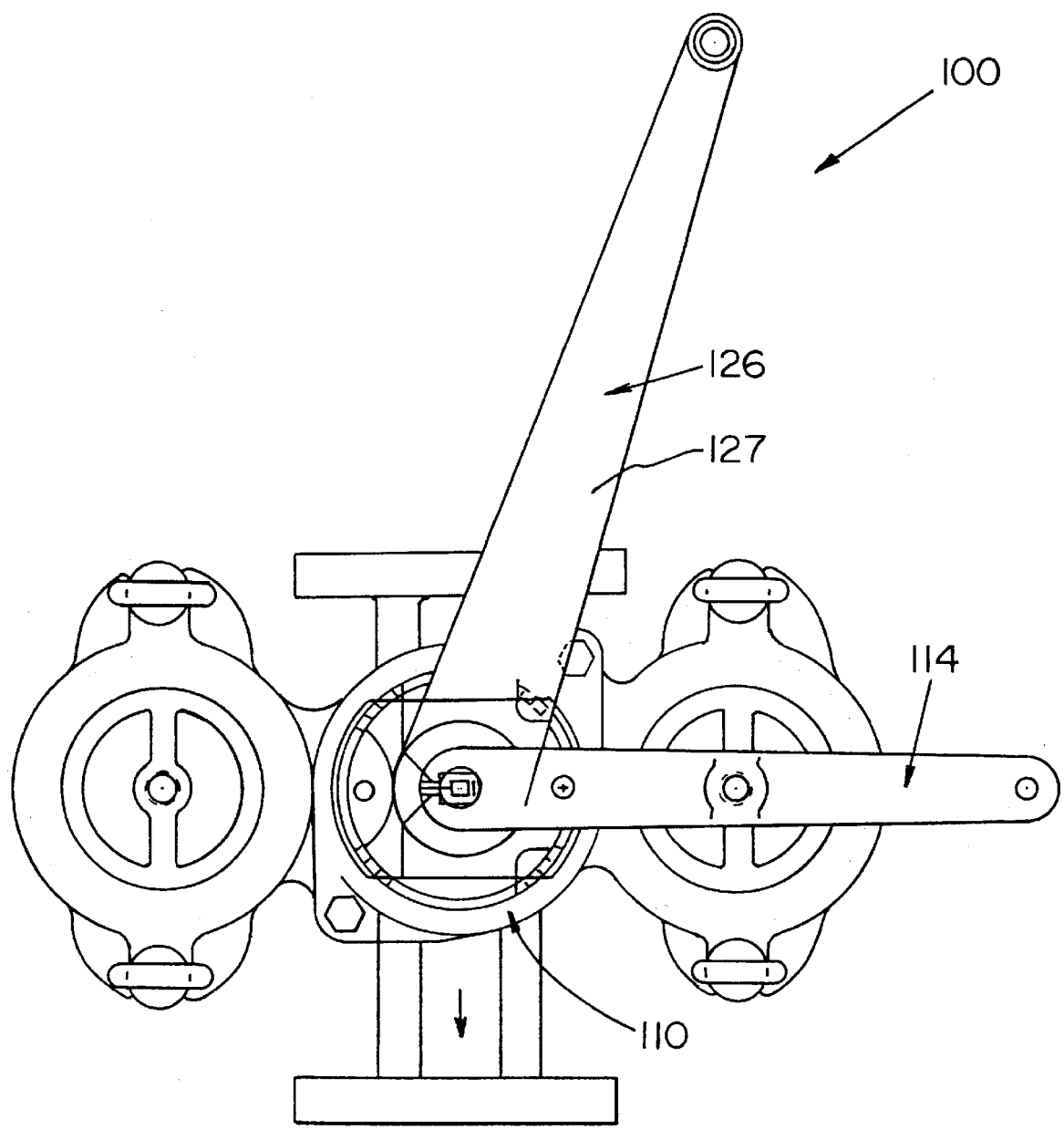
FIG. 2 is a top plan view of the valve assembly in FIG. 1 as used in conjunction with a dual canister strainer assembly.

A threading screw 124 is coupled to the plug 112. A control assembly 126 is coupled to the threading screw 124 to provide axial movement of the threading screw 124 for the unseating and seating of the upper and lower plug portions 116 and 118, respectively, within the valve housing 110. In the embodiment of FIG. 1, the assembly 126 is a reversible ratcheting assembly. As shown in FIG. 2, the ratcheting assembly includes an arm 127 connected to a control nut 125 through a conventional ratchet connection (not shown). The control nut 125 is coupled to the threading screw 124 such that rotation of the control nut 125 will result in axial motion of the threading screw 124 with the direction of the axial motion of the threading screw 124 determined by the direction of rotation of the control nut 125. As apparent to those skilled in the art, pivoting or rotation of the arm 127 will cause rotation of the control nut 125 in only one direction through the action of the ratchet connection. The "drive" direction of the ratchet connection can be selectively switched to change the direction of rotation of the control nut 125.

In FIG. 1, the upper and lower plug portions 116 and 118, respectively, are separated by an untapered (i.e., straight side in cross-section) portion 122 of the plug 112. An O-ring 128 is located on the untapered portion 122 of the plug body 112 to maintain sealing separation between the upper and lower plug portions 116 and 118, respectively, even as the plug 112 is raised and lowered during unseating and seating of the upper and lower plug portions 116 and 118, respectively.

The valve assembly 100 further includes a plurality of upper and lower ring cords 130 and 132, respectively. Each upper ring cord 130 is located such that an upper ring cord 130 substantially surrounds each opening 120 on the upper plug portion 116 to provide a seal therearound. Likewise, each lower ring cord 132 is located such that a lower ring cord 132 substantially surrounds each opening 120 on the lower plug portion 118 to provide a seal therearound. Preferably, the plurality of upper and lower ring cords 130 and 132, respectively, have a rectangular cross-sectional configuration. The ring cords 130 and 132 improve the seal around the openings 120, more so when the valve body 110 and the plug body 112 are both preferably constructed of metal.

Figure 3:
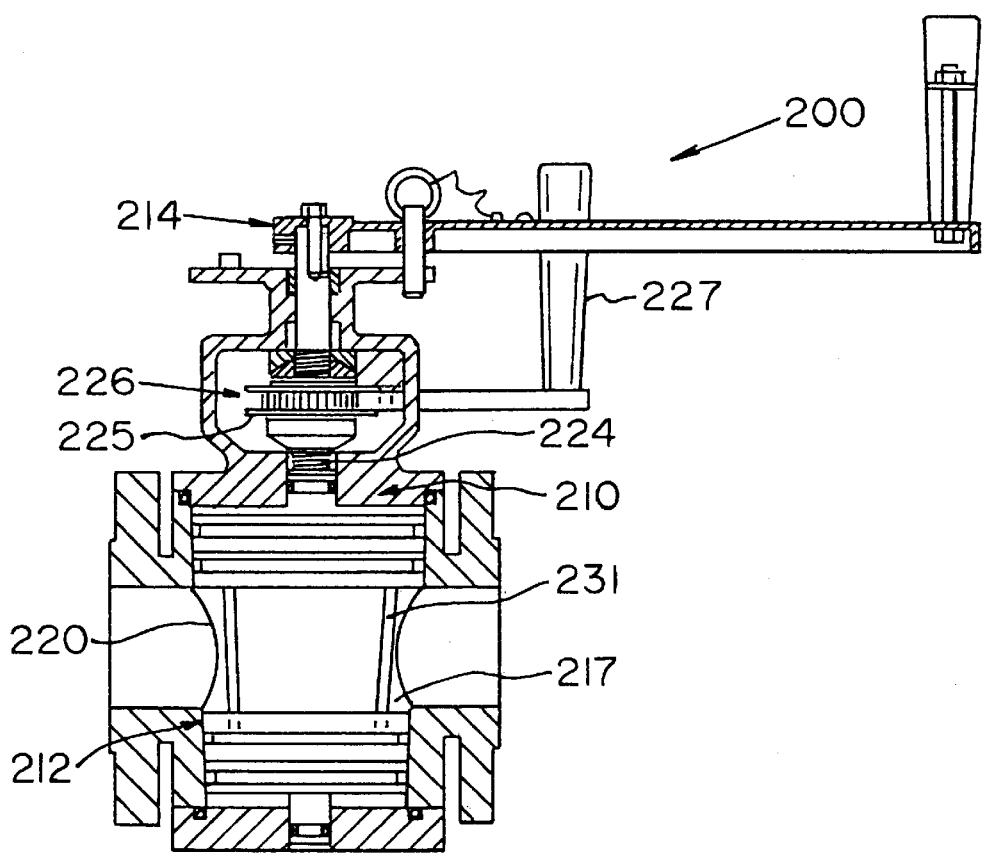
FIG. 3 is a front sectional view of a valve assembly depicting a rising stem single plug valve embodiment according to the present invention.

FIG. 3 depicts another embodiment of the present invention wherein a valve assembly 200 is a rising stem single plug valve. The valve assembly 200 includes a valve housing 210, a plug 212, and a handle assembly 214. The valve housing 210 is adapted to receive the plug 212 therein. The handle assembly 214 is coupled to the plug 212 to facilitate rotational movement of the plug 212 between operative positions in a conventional manner. The plug 212 is preferably constructed of stainless steel or bronze.

The plug 212 is comprised of a single plug portion 217 which forms only a single plug valve. The plug portion 217 contains a plurality of openings 220. The number and location of openings 220 are such to accommodate the necessary interior configuration of the plug portion 217 to achieve the desired flow pattern. FIGS. 4a–4d (discussed below) depict exemplary cross-sectional configurations of plug portion 217 interiors.

In a preferred embodiment, the plug portion 217 is tapered. The tapering of the plug portion 217 reduces the amount of drag during movement between operative positions.

A threading screw 224 is coupled to the plug 212. A control assembly 226 is coupled to the threading screw 224 to provide axial movement of the threading screw 224 for the unseating and seating of the plug portion 217 within the valve housing 210. In the illustrated embodiment, the assembly 226 is a ratcheting assembly substantially the same as the ratcheting assembly shown in FIG. 1. The ratcheting assembly includes a control nut 225 engaging the threading screw 224 and an arm 227 connected to the control nut 225 through a ratcheting connection (not shown).

The valve assembly 200 further includes a plurality of ring cords 231. Each ring cord 231 is located such that a ring cord 231 substantially surrounds each opening 220 on the plug portion 217 to provide a seal therearound. Preferably, the plurality of ring cords 231 each have a rectangular cross-sectional configuration. The ring cords 231 improve the seal around the openings 220, more so when the valve housing 210 and the plug 212 are both constructed of metal, which is preferred.

Figure 4A:
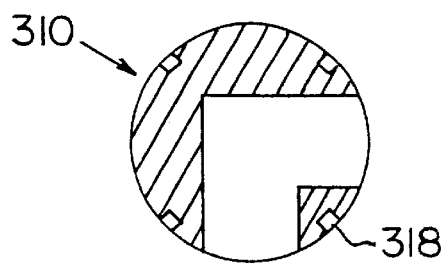
FIGS. 4a–4d are a series of cross-sectional views representing examples of interior configurations of the plug showing the ring cords around the plug openings in the preferred rectangular cross-sectional configuration.
Figure 4B:
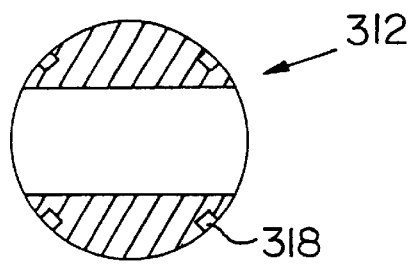
Figure 4C:
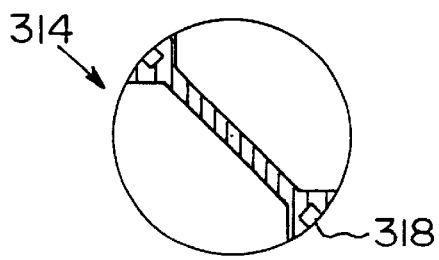
Figure 4D:
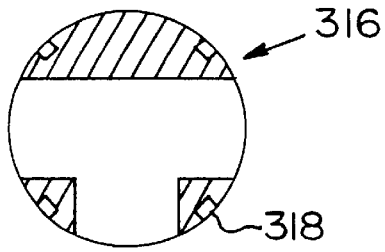

FIGS. 4a–4d depict exemplary embodiments 310, 312, 314, and 316 of cross-sectional configurations of plug portions 116, 118 or 217 interiors. Embodiment 310 of FIG. 4a shows an elbow configuration, embodiment 312 of FIG. 4b illustrates a straight configuration, embodiment 314 of FIG. 4c depicts a double elbow configuration, and embodiment 316 of FIG. 4d shows a tee configuration. It would be obvious to one skilled in the art to construct the present invention such that other cross-sectional configurations are utilized. The embodiments 310, 312, 314 and 316 include rectangular ring cords 318 substantially the same as ring cords 130, 132 and 231 discussed above with ring cords 318 surrounding the plug valve openings. The rectangular ring cords 318, 231, 132 and 131 provide greater surface area to increase the contact area of the ring cords 318, 231, 132 or 131 and improve the seal over conventional circular sealing members.

It will be understood by those skilled in the art that while the foregoing description sets forth in detail preferred embodiments of the present invention, modifications, additions, and changes might be made thereto without departing from the spirit and scope of the invention. The foregoing embodiments are merely illustrative of the present invention and not restrictive thereof. The scope of the present invention is set forth in the following claims and equivalents thereto.

We claim:

1. A valve assembly comprising:
   a valve housing;
   a plug received in the valve housing, the plug having at least one plug portion with a plurality of openings corresponding to the interior configuration of the plug portion;

a plurality of ring cords on the plug, each of the ring cords substantially surrounding one of the plurality of openings, wherein each ring cord is a substantially rectangular ring cord having a sealing surface extending substantially the entire width of the ring cord and a surface opposite the sealing surface being immediately adjacent the plug for substantially the entire width of the ring cord, wherein the plug has an upper and lower plug portion and an untapered portion between said upper and lower plug portion;

an O-ring located in the untapered portion of the plug; and a control assembly coupled to the plug for axial movement thereof.

2. A valve assembly according to claim 1, wherein the upper and lower plug portions are integrally formed.

3. A plug assembly according to claim 1 wherein each plug portion is tapered.

4. A valve assembly according to claim 3, wherein the control assembly includes a ratchet assembly, wherein the ratchet assembly has a selectable drive direction wherein the selected drive direction will control the axial movement of the plug.

5. A rising stem plug valve comprising:

a valve housing;

a plug received in the valve housing, the plug having an upper and lower integrally formed tapered plug portion, each tapered plug portion having a plurality of openings therein, wherein the plug valve has an untapered portion between said upper and lower plug portion and an O-ring located in the untapered portion of the plug;

a threading screw attached to the plug;

a control nut engaging the threading screw; and a ratchet assembly attached to the threading screw for axial movement of the plug without rotational movement of the plug, wherein the ratchet assembly will cause rotation of the control nut in only one selected drive direction through action of the ratchet assembly and wherein the drive direction of the ratchet assembly can be selectively switched to change the drive direction of the control nut.

6. A rising stem plug valve according to claim 5, further including a plurality of cross-sectionally rectangular ring cords, each ring cord substantially surrounding one of the plurality of openings and sealing directly against the valve housing.

7. A rising stem plug valve according to claim 5, further including a handle coupled to the plug for rotating the plug between operative positions.

8. A rising stem plug valve according to claim 5, wherein an interior configuration of at least one plug portion is a tee.

9. A rising stem plug valve according to claim 5, wherein an interior configuration of at least one plug portion is an elbow.

10. A rising stem plug valve according to claim 5, wherein an interior configuration of the at least one plug portion is straight.

11. A rising stem plug valve according to claim 5, wherein an interior configuration of the at least one plug portion is a double elbow.

12. A rising stem plug valve according to claim 5, wherein an interior configuration of the upper plug portion is different than an interior configuration of the lower plug portion and the tapered upper and lower plug portions each have a different degree of taper.

13. A rising stem plug valve according to claim 5, further including an arm for rotating the control nut through the ratchet assembly.

14. A valve assembly according to claim 2, wherein the control assembly includes a ratchet assembly.

* * * * *